United States Patent [19]

Flötotto

[11] 4,030,846

[45] June 21, 1977

[54] FURNITURE FRAME JOINT

[76] Inventor: Reinhard-Heinrich Flötotto, Brackweder Str. 52, D 4830 Gutersloh, Germany

[22] Filed: June 9, 1976

[21] Appl. No.: 694,357

[30] Foreign Application Priority Data

June 10, 1975 Germany ............................ 2525791

[52] U.S. Cl. .............................. 403/231; 403/402
[51] Int. Cl.² .................................... F16B 7/18
[58] Field of Search .......... 403/231, 286, 341, 401, 403/402; 52/753 F, 753 C, 753 D, 753 R, 758 H, 656, 475

[56] References Cited

UNITED STATES PATENTS

| | | | |
|---|---|---|---|
| 462,197 | 10/1891 | Briggs | 403/402 |
| 1,099,764 | 6/1914 | Polansky | 403/231 X |
| 2,808,624 | 10/1957 | Sullivan | 52/755 X |
| 2,832,101 | 4/1958 | Stark | 52/753 C X |
| 3,469,869 | 9/1969 | Ramakers | 52/753 F X |
| 3,695,655 | 10/1972 | Wipperman | 52/753 F |
| 3,835,610 | 9/1974 | Harper et al. | 52/753 F X |
| 3,845,604 | 11/1974 | Ottosson | 52/753 F X |

*Primary Examiner*—Wayne L. Shedd
*Attorney, Agent, or Firm*—Schuyler, Birch, Swindler, McKie & Beckett

[57] ABSTRACT

A knock-down sectional furniture frame incorporating two frame members and a coupling for fixing the two frame members together with the end of one member abutting the side of the other member. The coupling comprises a metal fitting which fits in the angle between the two members and which is rigidly fixed to a connector element that is insertable into a transverse bore in the one member. One bolt extends transversely through the other member and into an aligned bore in the end of the one member and engages the connector element. Another bolt extends transversely through the other member and engages with the metal fitting at a position spaced from the one member.

11 Claims, 7 Drawing Figures

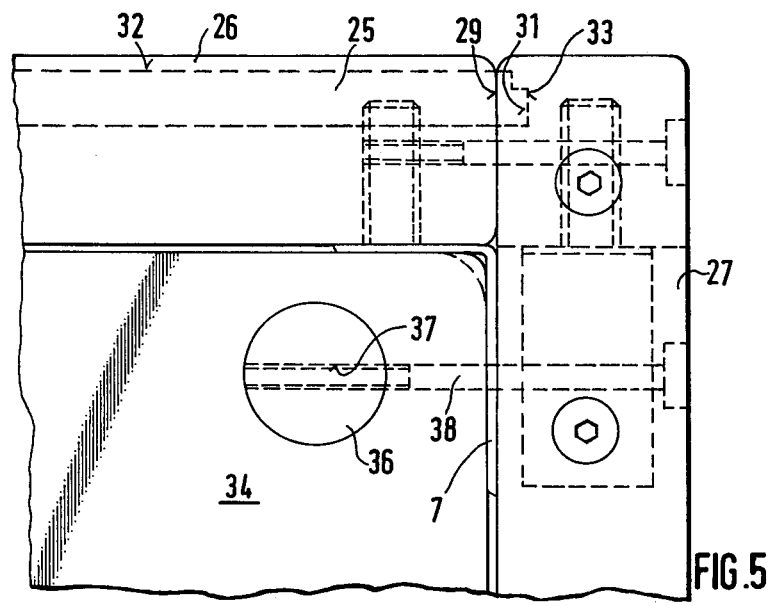
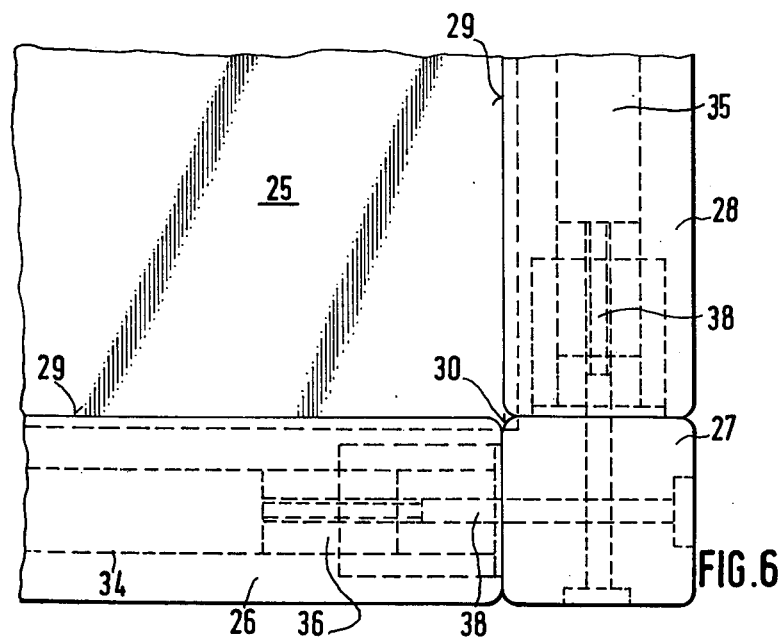

FURNITURE FRAME JOINT

The invention refers to a knock-down sectional furniture frame incorporating two frame members and a coupling for fixing the two frame members together with the end of one member abutting the side of the other member. The members are secured together with the use of a metal fitting which fits in the angle between the two members together with connecting pieces or fixing elements such as bolts, screws, rivets, pins and the like means of attachment. Bottom boards, side panels or partitions may be supported in the frame. Known furniture systems of this kind incorporating easily assembled frames, often cannot be used in the home or office because of too conspicuous or too weak corner couplings between the members. Furthermore, they do not usually allow of any versatile design, so that the basic frames available cannot form any basis for a versatile furniture system or the possibility of versatile design requires high expenditure.

In accordance with the present invention, in a knock-down sectional furniture frame incorporating two frame members and a coupling for fixing the two frame members together with the end of the one member abutting the side of the other member, the coupling comprises a metal fitting which fits in the angle between the two members and which is rigidly fixed to a connector element that is insertable into a transverse bore in the one member, a connnector piece which is insertable through aligned bores extending transversely through the other member and longitudinally into the end of the one member and which is engageable with the connector element, and a fixing element which is insertable into a second transverse bore in the other member and engageable with the metal fitting at a position spaced from the one member.

An extremely versatile furniture system can be built up from frames according to the invention with a plurity of wood members of different lengths, that is, in steps according to a suitable structural module. The members will be cut to length according to this structural module and prepared finished for assembly with, at their ends, prepared drilled holes the position of which correspond with corresponding drilled holes and connector elements of the metal fittings. The members may exhibit rectangular, preferably square, cross-sections all of the same size. Depending on the material and intended use both solid and hollow members may be used. As material for the members, above all wood is suitable, especially for the domestic field, but metal and plastics as well as other suitable materials may be used. Besides wood, metal members, chromium-plated or tempered or treated in other ways, exhibit particular suitability. The metal fittings lie on the inside and are therefore for the most part invisible. The connection between the metal fittings and the members is produced by ordinary means of attachment such as bolts, screws, nuts, rivets, pins or the like, which preferably are passed through the members and tightened up or secured in a suitable way. It is also conceivable, however, that screws or expandable pins merely engage in the members.

A particularly rigid corner connection is achieved in accordance with the invention by the tightening up at the two spaced points of attachment of the metal fitting with the two members. The first point of attachment lies in the outermost zone of the corner and uses the connector-piece which extends into appropriate coaxial drilled holes, essentially in parallel with the longitudinal axis of the end of the one member, the end of which is concealed by the laying against it of the side of the other member.

The connector element which is firmly connected to the metal fitting, runs transversely to the longitudinal axis of the end of the one member and can be inserted in the latter in a corresponding drilled hole and can be brought into engagement with the aforesaid connector-piece to bring about a firm connection. The connector element centres the end of the one member and holds it against the metal fitting, and is tightened up by the connecter piece, using, for example, a screw connection. In that way the members are connected firmly at the first point of attachment in a way which, as regards the stressing of the parts, is extremely favourable and at the same time rigid. The connector-element may be insertable in the metal fitting as a loose fitting piece, but preferably it is formed in one piece with the metal fitting and projects forward from this far enough for it to be able to be introduced to an adequate extent into the drilling prepared for it in the end of the one member.

The connecter-piece may be a connector-stud inserted laterally into the end of the one member before the joining together of the two members. Preferably the first transverse bore through the other member extends right through the other member and the connector piece is a bolt having a head and a screw-threaded shrank which is engageable in a tapped hole in the connector element.

Preferably the connector-element is formed in one piece with the metal fitting.

The particular advantages of a furniture system utilising the new frames making use of similar members with the same kind of connections are the following:

a. By choice of a suitable modular system for the lengths of the members, provision can be made for practically any sizes and proportions of the basic frame which occur for tables, chairs, easy chairs, bookshelves, writing-desks or the like in a simple way;

b. By breakdown of a suitable lengths of the semi-finished material for the members without offcuts into the member lengths of the required modular system a maximum of economy is gauranteed;

c. From the advantages under a) and b) there results optimum possibilities in combination with low costs of production;

d. The uniform employment of a single new universal metal corner fitting for the carrying out of an externally practically invisible, extremely rigid, corner connection of two or more members which respectively run at angles of 90° to one another, leads to a further lowering of the costs of production and allows of the employment of furniture, uniformly throughout the home and office field as also in the workrooms in factories, storerooms and hobby-rooms or the like;

e. In spite of versatile design possibilities the frames both in the factory and also by the purchaser himself are easily assembled, and hence are suitable in an outstanding way for shipment in space-saving packages.

In order to create the possibility of producing a corner connection at the ends of three members with only one single kind of metal fitting, the connector element and the metal fitting are preferably arranged to engage the connector piece and fixing element respectively at alternative positions which are spaced in the longitudinal direction of the other member.

In this way in the case of a corner connection of, e.g., three profiles the paths or the drilled holes for the connector pieces and fixing elements do not cross one another.

For the attachment of bottom boards, side panels, partitions or other flat elements of the furniture to be produced, longitudinal grooves may be preformed in the members.

Some examples of furniture frames in accordance with the invention are illustrated in the accompanying drawings, in which:

FIGS. 5 and 6 are a side elevation and a plan respectively of a corner of a piece of furniture from profiles and panels; and, FIG. 7 shows several elevations of examples of furniture which can be produced utilising frames in accordance with the invention.

FIGS. 2 to 4 illustrate the preferred example of a corner connection which can be produced between optionally two or three profiles consisting of wood, which are butted together at the ends. Because of the better clarity of the drawings reference is first made to FIG. 1 showing an example of a corner connection for only two members.

Figure 1:
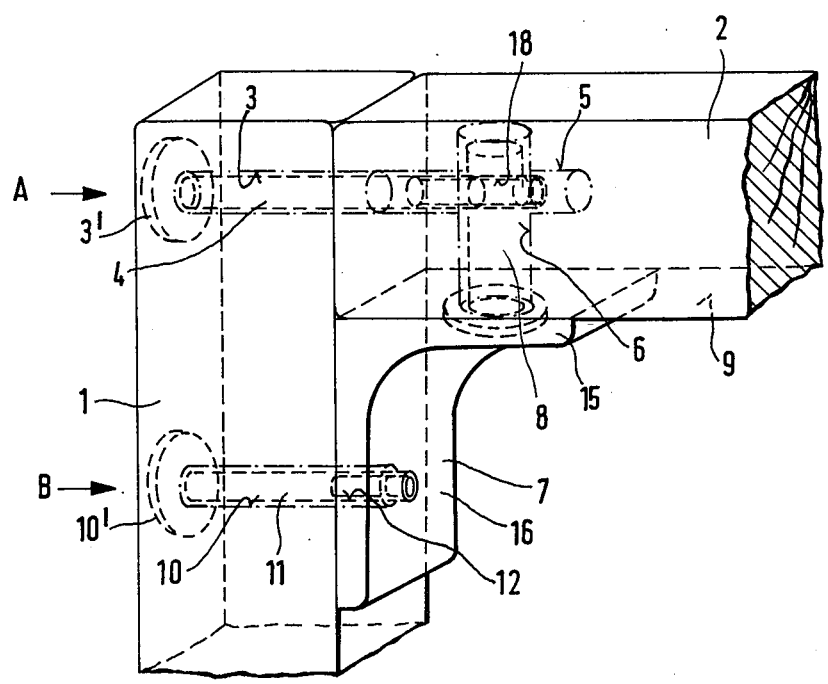
FIG. 1 is a diagrammatic perspective view of the corner connection of two members.

For connection of the end a first member 1 and the end of a second member 2 a fitting 7 of metal formed in an angular shape of arms 15, 16 is employed. From the contact surface of the arm 15 a studlike connector-element 8 projects vertically upwards and exhibits in its upper part a tapped hole 18 running transversely. A further tapped hole 12 lies in the upper half of the arm 16. In the end of the member 1 lies a hole 3 drilled near the end face and a further drilled hole 10 arranged at a distance from the former, both of which run transversely to the longitudinal direction of the member 1 and preferably exhibit countersunk holes 3' and 10' respectively for receiving the heads of bolts. In the end of the member 2 lies a blind drilled hole 6 and running transversely and a further blind drilled hole 5 running in the longitudinal direction of the end of the member 2 crossing the hole 6. The positions of the drilled holes in the ends of the members 1 and 2 are so laid out and dimensioned to standard measurements that they allow of assembly as described below.

For production of this corner connection the metal fitting 7 first of all gets fitted to the end of the member 2, whereby the studlike connector element 8, preferably with a relatively close fit, is driven into the drilled hole 6 provided for it. When the arm of the metal fitting 7 reaches the inner face 9 of the end 2 of the member the tapped hole lies coaxially with the drilled hole 5.

Now the end of the member 1 is as illustrated laid against the end of the member 2 so that at an upper point of attachment arrowed by A the drilled hole 3 is coaxial with the drilled hole 5, and at a lower point of attachment B the transverse drilled hole 10 is coaxial with the tapped hole 12. As a counter-piece 4 as well as fixing element 11 bolts with heads, preferably provided with hexagon recesses, are now introduced into holes 3, 5 and 10 up to engegement with the tapped holes 18 and 12 respectively, into which they are now screwed until both are firmly tightened up. In this way the end of the member 1 close to its end face at the point A is tightened against the end face of the end of the member 2 and fixed because of the engagement of the threaded metal end of the connector piece 4 in the tapped hole 18 in the connector element 8 which likewise consists of metal. The end of the member 2 is in turn connected firmly by the connector element 8 now fixed lying inside it, to the metal fitting 7 which holds the ends of the member 1 and 2 at right angles to one another, so that both ends are fixed to one another by the connector piece 4. At the other point of attachment B the end of the member is attached to the metal fitting at a distance of say 7cm. from the point of attachment A.

The resulting strength and rigidity of the corner connection are also considerably increased by the production of a diagonal tightening. The metal fitting 7 itself is formed in a very rigid way inclusive of its connector element element 8 which through the tightening up of the end of the member 1, effected at two points at a considerable distance from one another, leads to a corner connection which is suprisingly rigid against stresses of any kind.

This strength of the connection is normally only finally attainable if members are employed having a cross section sufficiently large to allow the two points of attachment to lie so far from one another. The metal fitting 7 in practice makes good this large cross-section of attachment without the cross-section of the wood of the members having to be selected so large.

Figure 2:
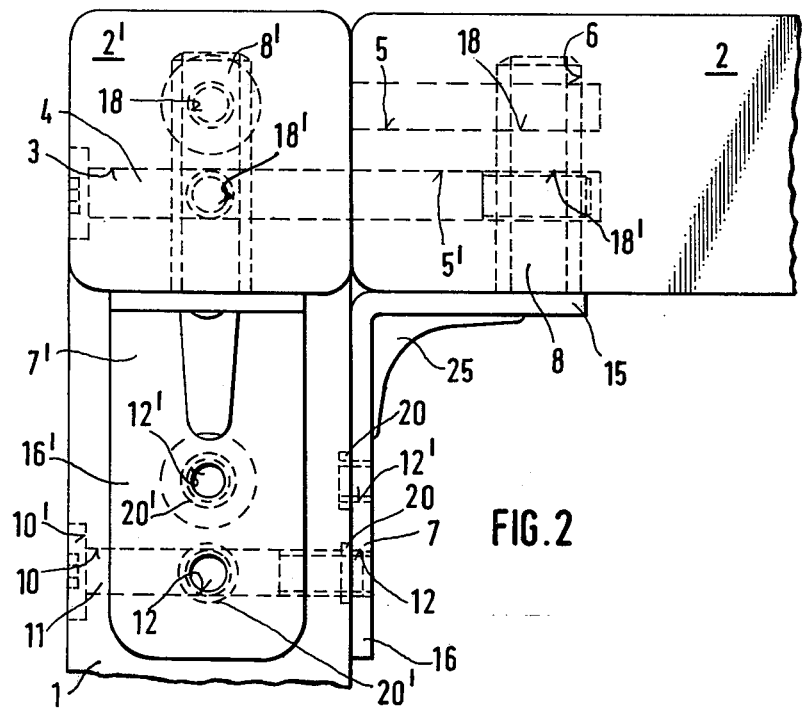
FIGS. 2 to 4 are a front elevation, a plan and a side elevation respectively of another corner connection applicable at option to corners of two or more members.
Figure 3:
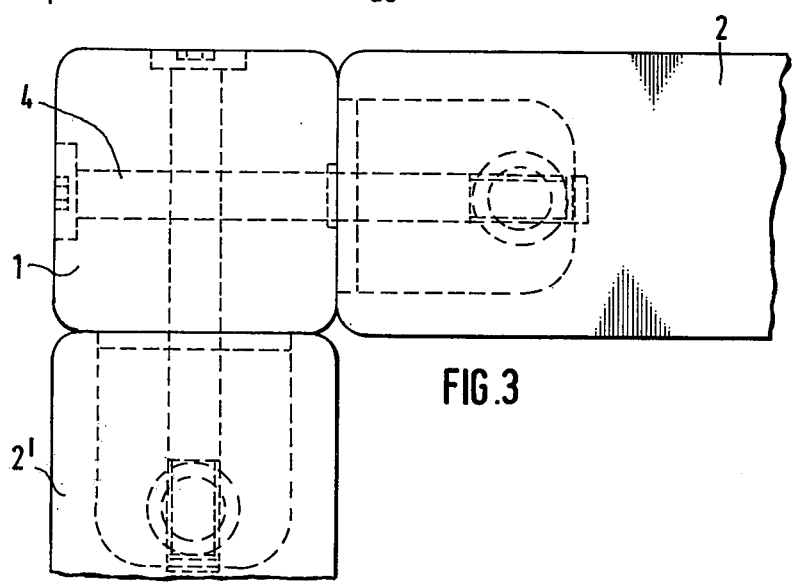
Figure 4:
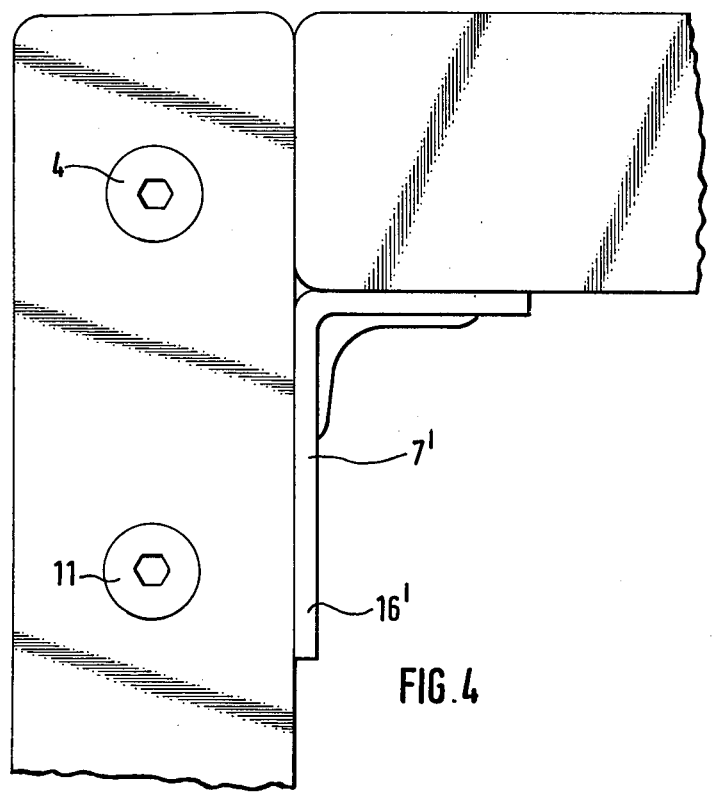

If instead of two members 1, 2, three members 1, 2, 2' abut at a corner as, for example, in the case of a table with two top side members and one table-leg member, the preceding principle of a corner connection may be further developed as shown in FIGS. 2 to 4.

If in the studlike connector element 8' of a second angular metal fitting 7' the tapped hole were to lie at the samd height as the tapped hole 18 in the connector element 8 of the metal fitting 7, the connector elements 4 provided for these would interfere where they cross. For this reason each studlike connector element 18, 18' at differant heights vertically. The same goes for 16, 16' of the metal fittings 7, 7', which respectively exhibit two tapped holes 12, 12' lying apart from one another at an appropriate distance. For the connection between the ends of the members 1 and 2 the lower tapped holes 18' and 12 respectively are employed as shown and for the connection of the end 2' of the further member to the member 1 the tapped holes 18 and 12' in the metal fitting 7' which lie at a higher level, are employed. In the end of the member 2 two drilled holes 5, 5' to be emplyed at option may already be provided. The tapped holes 12, 12' in longer arms of the metal fittings 7 and 7' respectively, which on the one hand prolong the thread and on the other hand centre and secure the metal fittings 7 or 7' against the bearing surface.

The metal fitting 7 or 7' further exhibits a fillet web 25 as a diagonal stiffening. The connector-element 8 is preferably a hollow stud in the wall of which the tapped hoies 18, 18' are formed.

In the case trapezoidal tables and other frames with acute or obtuse-angled corner connections members with round cross-sections are preferably employed, the surfaces of which in practice form bearing surfaces for the metal fitting.

FIGS. 5 and 6 show that the working body surfaces such e.g. as a table-top 25 can be bordered all round by members 26, 27, 28 and hereby obtain optimum protection of the edges. For this purpose a stepped groove 31 running all around is cut into the inner faces 29 of the members 26, 28 and into the corner 30 of the member 27 facing the table-top 25, into which the table-top 25 can be inserted with a close fit. The members 26, 27, 28 thereby overlap the surface 32 of the table-top 25 all round at its edges 33, so that veneers or plastics coatings even in the case of high mechanical stress on the edges 33 cannot come away there. Less rigid panels with the edges 33 sensitive to impact can therefore also be employed. Edge veneers are entirely eliminated. The system therefore combines very high rigidity of the frame with secure protection of edges.

For connection of a rear wall 34 or sidewall 35 a disc 36 let in at the point is used, having a tapped metal hole 37 into which a suitably elongate bolt 38 passing transversely through the metal fitting engages.

Figure 7:
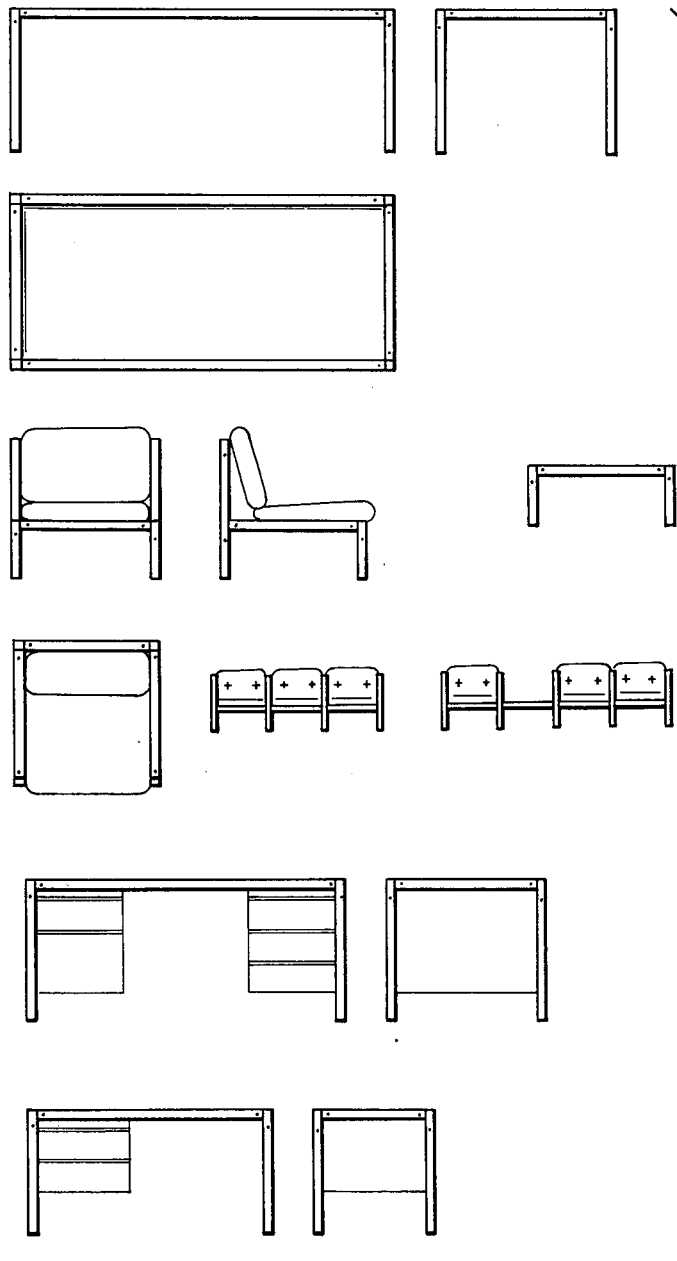

FIG. 7 shows a number of elevations of examples of furniture which are produced by the employment of members cut to length according to a stepped modular system and corner connections of the kind described above, viz., at the top a table, below it a piece of upholstered furniture, next to that upholstered chair elements in a row, on the right in combination with a low table, at the bottom a desk and a typewriter table.

I claim:

1. In a knock-down sectional furniture frame incorporating first and second frame members and a coupling for fixing said frame members together with he end of said first member abutting the side of the said second member the improved coupling which comprises a first transverse bore into said first member, a longitudinal bore extending from said end of said first member and intersecting said first transverse bore, a second transverse bore in said second member in alignment in said longitudinal bore in said first member, a third transverse bore in said second member from said second transverse bore, a metal fitting adapted to fit in the angle between said members, a connector element rigidly fixed to said metal fitting and adapted to be inserted into said first transverse bore, a connector piece insertable through said second transverse bore and said longitudinal bore and engageable with said connector element, and a fixing element in said third transverse bore and engageable with said metal fitting.

2. A frame according to claim 1, wherein said connector element is formed in one piece with said metal fitting.

3. A frame according to claim 1, wherein said metal fitting is of angular shape with two arms running at right angles to one another for engagement with the sides of said two members.

4. A frame according to claim 1, wherein said second transverse bore extends right through said second member and said connector piece is a bolt having a head and a screw threaded shank engageable with a tapped hole in said connector element.

5. A frame according to claim 1, wherein said third transverse bore extends right through said second member and said fixing element is a bolt having a head and a screw threaded shank engageable with a tapped hole in said metal fitting.

6. A frame according to claim 5, wherein said tapped hole in said metal fitting continues into an annular bead formed on a face of said fitting adjacent to said second member.

7. A frame according to claim 1, wherein said connector element and said metal fitting are adapted to engage said connector piece and said fixing element respectively at alternative positions which are spaced in the longitudinal direction of said second member.

8. A frame according to claim 7, wherein said second transverse bore extends right through said second member and said connector piece is a bolt having a head and a screw threaded shank optionally engageable in one of two tapped holes in said connector element, and wherein said third transverse bore extends right through said second member and said fixing element is a bolt having a head and a screw threaded shank optionally engageable with one of two tapped holes in said metal fitting.

9. A frame according to claim 8, wherein said metal fitting is an angular shape having a first longer arm provided with said two tapped holes and adapted for engagement with said side of said second member, and a second shorter arm carrying said connector element.

10. A frame according to claim 7, incorporating a further member and a similar coupling for fixing the end of said further member abutting another side of said second member and extending at an angle to said first member, said second transverse bores for said two couplings being offset in the longitudinal direction of said second member, and said third transverse bores for said two couplings being offset in the longitudinal direction of said second member.

11. A frame according to claim 1, wherein said members are formed with longitudinal grooves adapted to receive a flat element.

* * * * *